(12) United States Patent
Suzuki

(10) Patent No.: US 6,583,208 B1
(45) Date of Patent: *Jun. 24, 2003

(54) POLYESTER RESIN COMPOSITIONS AND PROCESSES FOR THE PREPARATION THEREOF

(75) Inventor: Noriyuki Suzuki, Settu (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/530,240

(22) PCT Filed: Oct. 28, 1998

(86) PCT No.: PCT/JP98/04869

§ 371 (c)(1),
(2), (4) Date: Apr. 27, 2000

(87) PCT Pub. No.: WO99/23162

PCT Pub. Date: May 14, 1999

(30) Foreign Application Priority Data

Oct. 30, 1997 (JP) ............................................. 9-298529
Nov. 12, 1997 (JP) ............................................. 9-310137

(51) Int. Cl.$^7$ ................................................. C08K 3/34
(52) U.S. Cl. ................................................................. 524/445
(58) Field of Search ........................................ 523/204, 205, 523/212, 213; 524/265, 267, 269, 445, 446, 447; 501/146, 148, 149

(56) References Cited

U.S. PATENT DOCUMENTS

| | | | |
|---|---|---|---|
| 4,579,884 A | 4/1986 | Liu | 523/216 |
| 4,874,728 A * | 10/1989 | Eilliott et al. | 501/148 |
| 5,292,908 A * | 3/1994 | Onikata et al. | 556/173 |
| 5,514,734 A | 5/1996 | Maxfield et al. | 523/204 |
| 5,952,093 A * | 9/1999 | Nichols et al. | 428/323 |
| 6,239,195 B1 * | 5/2001 | Suzuki et al. | 523/204 |

FOREIGN PATENT DOCUMENTS

| | | |
|---|---|---|
| EP | WO 93/04118 | 3/1993 |
| EP | WO 93/11190 | 6/1993 |
| EP | WO 95/06090 | 3/1995 |
| EP | 0 899 308 A1 * | 3/1999 |
| GB | 2 048 285 A | 12/1980 |
| JP | 7-268188 | 10/1965 |
| JP | 63-297460 | 12/1988 |
| JP | 63-304038 | 12/1988 |
| JP | 4-257593 | 9/1992 |
| JP | 5-194851 | 8/1993 |
| JP | 5-287177 | 11/1993 |
| JP | 6-207044 | 7/1994 |
| JP | 7-26123 | 1/1995 |
| JP | 8-73710 | 3/1996 |
| JP | 9-118792 | 5/1997 |
| JP | 9-201821 | 8/1997 |
| JP | 9-301713 | 11/1997 |
| WO | WO 93/11190 A1 * | 6/1993 |
| WO | WO97/43343 A1 * | 11/1997 |

* cited by examiner

Primary Examiner—Edward J. Cain
Assistant Examiner—K Wyrozebski Lee
(74) Attorney, Agent, or Firm—Armstrong, Westerman & Hattori, LLP

(57) ABSTRACT

Polyester resin compositions each comprising a polyester resin and a silane-treated phyllosilicate, wherein the silane-treated foliated phyllosilicate is one prepared by incorporating a swellable phyllosilicate salt with organo-silane of the general formula (I): $Y_nSiX_{4-n}$ (wherein n is an integer of 0 to 3; Y is an optionally substituted $C_1$–$C_{25}$ hydrocarbon group; and X is a hydrolyzable group or hydroxyl, with the proviso that when n or 4–n is 2 or above, nY's or (4–n)X's may be the same or different from each other) and the maximum layer thickness of the silane-treated foliated phyllosilicate in the composition is larger than 100 Å but smaller than 2000 Å.

17 Claims, No Drawings

POLYESTER RESIN COMPOSITIONS AND PROCESSES FOR THE PREPARATION THEREOF

TECHNICAL FIELD

The present invention relates to a polyester resin composition comprising a polyester resin and a silane-treated foliated phyllosilicate, and to a process for preparing the same.

BACKGROUND ART

A polyester resin such as poly(ethylene terephthalate) has been used in a lot of industrial applications, for example, as a fiber and a film, since they are excellent in thermal resistance, chemical resistance, weatherability, mechanical properties, electrical properties and the like.

If a polyester resin composition can be prepared by dispersing a silicate, which is a silicon-containing compound having a layered structure, into the polyester resin in the form of a uniform layer, it is expected that mechanical properties and thermal resistance of the polyester resin can be improved without deterioration in surface appearance.

As a process for preparing such a resin composition using an organo-silane, following processes have been conventionally known. (1) A process for preparing a polymer nanocomposite, wherein monomers of a resin are polymerized in the presence of layered or fibrillar particles treated with an organometallic compound such as an organo-silane (the pamphlet of International Patent Publication No. 95/06090 (1995), the specification of U.S. Pat. No. 5,514,734).

(2) A process for preparing a polymer nanocomposite, wherein layered particles treated with an organo-silane or an onium salt and a melt kneadable resin are melt kneaded with a kneading machine such as a twin screw extruder (the pamphlet of International Patent Publication No. 93/04118 (1993), the pamphlet of International Patent Publication No. 93/11190 (1993)).

(3) A process for preparing a poly(arylene sulfide) composite material, comprising dissolving poly(arylene sulfide) in an organic solvent such as N-methyl-2-pyrrolidone, then dispersing a layered silicate treated with an organic onium salt, an organic halogenated silane or an organic silazane, and thereafter re-precipitating in a poor solvent such as water (Japanese Unexamined Patent Publication No. 194851/1993).

As a process for preparing the resin composition without using the organo-silane, following processes have been conventionally known.

(4) A process for preparing a thermoplastic polyester composition wherein a layered inorganic filler having an interlayer charge of 0.2 to 1.0 is swollen with glycols and thereafter a polyester resin is polymerized (Japanese Unexamined Patent Publication No.26123/1995).

(5) A process for preparing a thermoplastic polyester composition, wherein an inorganic compound such as swellable fluoromica obtained by heating a mixture of talc and alkali silicofluoride in a specific proportion is swollen with glycols and thereafter a polyester resin is polymerized (Japanese Unexamined Patent Publication Nos. 268188/1995 and 73710/1996).

In the above-mentioned (1) and (2) there is disclosed an invention relating to a resin composite material comprising a resin matrix and layered particles combined with an organometallic compound such as an organo-silane and, having an average layer thickness of at most about 50 Å and the maximum layer thickness of at most about 100 Å, namely, a composite material using layered particles combined with an organo-silane and nylon 6 as a resin matrix, for the purpose of improving resin's flexural modulus, flexural strength, deflection temperature under load and dimensional stability. But no resin composite material using a polyester resin as a resin matrix has been disclosed. If these processes apply to polyester resins, it is not sufficient to disperse the layered particles treated with silane and to improve mechanical properties and thermal resistance. When the process (3) is applied for a polyester resin, a mixed solvent of phenol and tetrachloroethane, hexafluoroisopropanol and the like can be mentioned as the organic solvent. From the viewpoints of safety and health, productivity, available poor solvents and the like, such a process is not industrially available at all and is extremely difficult to be applied as a process for preparing a polyester resin composition.

On the other hand, Japanese Unexamined Patent Publication No.118792/1997 points out that dispersing layered particles into molecules with separating them into individual layers in a polypropylene-based resin or in a vinyl-based polymer allows the layered particles to form a laminate structure, so that it becomes difficult for the layered particles to show isotropic properties (Science of Clay, Vol. 30 (2), 143–147 (1990)) and that when layered particles inherently having a high modulus of elasticity are dispersed into conditions similar to unit layers, they bend and the obtained modulus of elasticity is less than inherently expected.

The tensile modulus of elasticity of the composite material using layered particles combined with an organo-silane and nylon 6, which is disclosed in the above-mentioned (1) and (2) available from Allied-Signal Inc., has been improved in comparison with that of the nylon 6 resin itself. But it exhibits insufficient improvement compared to a composite material composed of layered particles treated with ammonium 11-decanoate and nylon 6.

Furthermore, the present inventors obtained a composite material by dispersing layered particles into a thermoplastic polyester resin in the form of a laminar structure similar to their unit layer (the thickness of the unit layer is about 10 Å) and evaluated its flexural modulus, flexural strength, deflection temperature under load and dimensional stability. It has been found that the effects are insufficient though they have been improved in comparison with materials in which such conventional particles are contained, in the form of laminated and flocculated states, in a thermoplastic polyester resin by means of an extrusion melt mixing or the like.

Moreover, the present inventors have attempted to prepare a thermoplastic polyester resin composition in accordance with the conventional methods using no organo-silane, namely, the methods of (4) and (5), but could not obtain desired dispersing state, layer thickness and physical properties. Namely, a small amount of a swellable fluoromica could not improve modulus of elasticity or deflection temperature at all, and it was found out that a layer thickness or a dispersing state of the swellable fluoromica in the composition are the same as those of the aggregated structure of the swellable fluoromica before mixing by transmission electron microscope observation and small-angle X-ray diffraction measurement.

As mentioned above, the present situation is that techniques in which a polyester resin composition having excellent physical properties is obtained by safely, completely, uniformly and finely dispersing inorganic substances into a thermoplastic polyester resin have not been provided yet.

Accordingly, even if a layered silicate is dispersed in a state similar to forming a unit layer, wherein the average layer thickness is at most about 50 Å and the maximum layer thickness is at most about 100 Å, or even if layered silicate is incorporated in a conventional state wherein it remains laminated or flocculated, it is difficult to obtain polyester resin compositions sufficiently improved in mechanical properties, deflection temperature under load and dimension stability.

DISCLOSURE OF THE INVENTION

The object of the present invention is to solve the above-mentioned conventional problems and to provide a polyester resin composition having improved flexural modulus of elasticity, flexural strength, deflection temperature under load and dimensional stability, which can give molded articles with excellent appearance and to provide a process for preparing the same by exfoliating inorganic compounds into laminars having suitable thickness which can exhibit an effect of improving physical properties and dispersing the inorganic compounds as many individual layers with thickness in nanomerter orders.

Namely, the present invention relates to (1) a polyester resin composition comprising a thermoplastic polyester resin and a silane-treated foliated phyllosilicate, wherein the silane-treated foliated phyllosilicate is prepared by introducing an organo-silane represented by the following general formula (I):

$$Y_n SiX_{4-n} \qquad (I)$$

wherein n denotes an integer of 0 to 3, Y denotes a hydrocarbon group having 1 to 25 carbon atoms which may have a substituent, X denotes a hydrolyzable group or a hydroxyl group, n units of Y or (4−n) units of X may, respectively, be the same or different if n or (4−n) is at least 2, into a swellable phyllosilicate and wherein the maximum layer thickness of the silane-treated foliated phyllosilicate in the polyester resin composition is more than 100 Å and at most 2000 Å, (2) the polyester resin composition of the above-mentioned (1), wherein the maximum layer thickness of the silane-treated foliated phyllosilicate in the polyester resin composition is 200 Å to 1800 Å, (3) the polyester resin composition of the above-mentioned (1), wherein the maximum layer thickness of the silane-treated foliated phyllosilicate in the polyester resin composition is 300 Å to 1500 Å, (4) the polyester resin composition of the above-mentioned (1), (2) or (3), wherein the average layer thickness of the silane-treated foliated phyllosilicate in the polyester resin composition is at least 20 Å and at most 500 Å, (5) the polyester resin composition of the above-mentioned (1), (2) or (3), wherein the average layer thickness of the silane-treated foliated phyllosilicate in the polyester resin composition is more than 50 Å and at most 300 Å, (6) the polyester resin composition of the above-mentioned (1), (2), (3), (4) or (5), wherein the dispersing particle number [N] of the silane-treated foliated phyllosilicate particles present in a 100 $\mu m^2$ area of the polyester resin composition is at least 30 based on unit proportion, (7) the polyester resin composition of the above-mentioned (1), (2), (3), (4), (5) or (6), wherein an average aspect ratio (layer length/layer thickness ratio) of the silane-treated foliated phyllosilicate in the polyester resin composition is 10 to 300, (8) the polyester resin composition of the above-mentioned (1), (2), (3), (4) or (5), wherein a proportion ([R100] value) of the number of silane-treated foliated phyllosilicate having layer thickness greater than 100 Å to the total number of the silane-treated foliated phyllosilicate is at least 10%, (9) the polyester resin composition of the above-mentioned (1), (2), (3), (4) or (5), wherein the [R(100)] value is at least 30%,

(10) the polyester resin composition of the above-mentioned (1), (2), (3), (4) or (5), wherein the [R(100)] value is at least 50%,

(11) the polyester resin composition of the above-mentioned (8), (9) or (10), wherein a proportion ([R200] value) of the number of silane-treated foliated phyllosilicates having layer thickness greater than 200 Å to the total number of the silane-treated foliated phyllosilicate is at least 0.3× [R100],

(12) the polyester resin composition of the above-mentioned (8), (9) or (10), wherein the [R200] value is at least 0.7×[R100],

(13) the polyester resin composition of the above-mentioned (11) or (12), wherein a proportion ([R300] value) of the number of silane-treated foliated phyllosilicates having layer thicknesses greater than 300 Å to the total number of the silane-treated foliated phyllosilicate is at least 0.4×[R200],

(14) the polyester resin composition of the above-mentioned (11) or (12), wherein the [R300] value is at least 0.8× [R200],

(15) a process for preparing a polyester resin composition comprising a thermoplastic resin and a silane-treated foliated phyllosilicate, which comprises (A) a step of preparing a silane-treated foliated phyllosilicate by introducing an organo-silane represented by the general formula (I):

$$Y_n SiX_{4-n} \qquad (I)$$

wherein n denotes an integer of 0 to 3, Y denotes a hydrocarbon group having 1 to 25 carbon atoms which may have a substituent, X denotes a hydrolyzable group or a hydroxyl group, n units of Y or (4−n) units of X may, respectively, be the same or different if n or (4−n) is at least 2, to a swellable phyllosilicate, (B) a step of preparing a dispersion system by mixing the silane-treated foliated phyllosilicate and glycols, (C) a step of preparing a mixture by adding the dispersion system to a molten polyester unit and/or polyester with a low molecular weight, and (D) a step of increasing a molecular weight of the polyester unit and/or the polyester with a low molecular weight in the above mixture by condensation polymerization,

(16) the process for preparing a polyester resin composition of the above-mentioned (15), wherein, in the step (A), the silane-treated foliated phyllosilicate is obtained by adding the organo-silane after enlarging a basal spacing of the swellable phyllosilicate in a dispersion medium, and therby a basal spacing of the silane-treated foliated phyllosilicate becomes larger than the initial basal spacing of the swellable phyllosilicate by the organo-silane introduced,

(17) the process for preparing a polyester resin composition of the above-mentioned (15) or (16), wherein an basal spacing of the silane-treated foliated phyllosilicate dispersing in the dispersion system obtained in the step (B) is at least three times larger than the initial basal spacing of the swellable phyllosilicate,

(18) the process for preparing a polyester resin composition of the above-mentioned (15), (16) or (17), wherein a logarithmic viscosity of the polyester unit and/or the polyester with a low molecular weight is at least 0.001 dl/g and less than 0.4 dl/g, and

(19) the process for preparing a polyester resin composition of the above-mentioned (15), (16), (17) or (18), wherein the polyester unit and/or the polyester with a low molecular weight is obtained by depolymerizing a polyester resin material with glycols.

BEST MODE FOR CARRYING OUT THE INVENTION

The polyester resin composition of the present invention is a polyester resin composition comprising a thermoplastic polyester resin and a silane-treated foliated phyllosilicate, wherein the silane-treated foliated phyllosilicate is prepared by introducing an organo-silane represented by the following general formula (I):

$$Y_nSiX_{4-n} \qquad (I)$$

wherein n denotes an integer of 0 to 3, Y denotes a hydrocarbon group having 1 to 25 carbon atoms which may have a substituent, X denotes a hydrolyzable group or a hydroxyl group, n units of Y or (4−n) units of X may, respectively, be the same or different if n or (4−n) is at least 2, to a swellable phyllosilicate, and wherein the maximum layer thickness of the silane-treated foliated phyllosilicate in the polyester resin compound is more than 100 Å and at most 2000 Å.

There is no particular limitation for the thermoplastic polyester resin of the present invention, but it includes known homopolymers and/or copolymers which are synthesized from one or at least two kinds of aromatic dicarboxylic acids or alkyl esters thereof and one or at least two kinds of glycols. Examples of the thermoplastic polyester resins are poly(ethylene terephthalate), poly(propylene terephthalate), poly(butylene terephthalate), poly(hexamethylene terephthalate), poly(cyclohexane-1,4-dimethyl terephthalate), poly(neopentyl terephthalate), poly(ethylene isophthalate), poly(ethylene naphthalate), poly(butylene naphthalate), poly(hexamethylene naphthalate) and the like, and polyester copolymers thereof. Among these thermoplastic polyester resins, poly(ethylene terephthalate) and poly (butylene terephthalate) can be preferably used. These thermoplastic polyester resins may be used solely or in a combination use of two or more thereof having different composition or component and/or viscosity.

The swellable phyllosilicate is substantially formed of a tetrahedral sheet of silicon oxide and octahedral sheet of metal hydroxide, and examples thereof are smectite group clay minerals, swellable mica, kaolin group clay minerals and the like.

The smectite group clay minerals are represented by the general formula (II):

$$X_{0.2-0.6}Y_{2-3}Z_4O_{10}(OH)_2 \cdot nH_2O \qquad (11)$$

wherein X denotes at least one kind selected from the group consisting of K, Na, ½Ca and ½Mg, Y denotes at least one kind selected from the group consisting of Mg, Fe, Mn, Ni, Zn, Li, Al and Cr, and Z denotes at least one kind selected from the group consisting of Si and Al. They may be either a natural product or a chemically synthesized product.

Although H₂O denotes a water molecule bonding to an interlayer ion, n remarkably changes depending upon an interlayer ion and a relative humidity.

Examples of the smectite group clay minerals are montmorillonite, beidellite, nontronite, saponite, iron saponite, hectorite, sauconite, stevensite, bentonite and the like, or their substituted products, their derivatives and mixtures thereof.

The smectite group clay minerals have basal spacing of approximately 10 to 17 Å in their initial flocculated state. The smectite group clay minerals in their flocculated states have thickness of 1000 Å to 1,000,000 Å.

The swellable mica is represented by the general formula (III):

$$X_{0.5-1.0}Y_{2-3}(Z_4O_{10})(F,OH)_2 \qquad (III)$$

wherein X denotes at least one kind selected from the group consisting of Li, Na, K, Rb, Ca, Ba and Sr, Y denotes at least one kind selected from the group consisting of Mg, Fe, Ni, Mn, Al and Li, and Z denotes at least one kind selected from the group consisting of Si, Ge, Al, Fe and B. They may be either a natural product or a chemically synthesized product.

The swellable mica has a property that it swells in water, a polar solvent compatible with water in arbitrary proportion or a mixed solvent containing water and the polar solvent. Examples thereof are lithium taeniolite, sodium taeniolite, lithium type tetrasilicate mica, sodium type tetrasilicate mica and the like, or their substituted products, their derivatives or mixtures thereof. In the present invention the following compounds corresponding to the vermiculites also can be employed as a kind of the swellable micas.

The swellable mica has basal spacing of approximately 10 to 17 Å in their initial flocculated states. The swellable mica in their flocculated state has thickness of approximately 1,000 Å to 1,000,000 Å.

The clays corresponding to the vermiculites include the trioctahedral type and the dioctahedral type, and the clays represented by the general formula (IV):

$$(Mg, Fe, Al)_{2-3}(Si_{4-x}Al_x)O_{10}(OH)_2 \cdot (M^+, M^{2+}_{1/2})_x \cdot nH_2O \qquad (IV)$$

wherein M denotes an exchangeable cation of alkali or alkaline earth metal such as Na and Mg, x denotes 0.6 to 0.9 and n denotes 3.5 to 5.

The clays corresponding to the vermiculites have basal spacing of approximately 10 to 17 Å in their initial flocculated state. The clays corresponding to the vermiculites in their flocculated state have thickness of approximately 1,000 Å to 5,000,000 Å.

As the kaolin group clay minerals, examples are a natural or chemically synthesized kaolinite, dickllite, halloysite and the like, or their substituted products, their derivatives or mixtures thereof.

The synthesized kaolin group clay minerals can be prepared, for example, by the following method. For example, synthesized kaolinite is precipitated in a method wherein colloidal silica and alumina sol are mixed in a kaolinite composition ratio to form a starting material, which is then subjected to hydrothermal treatment by setting a concentration of the starting material high and treating at 150 to 300° C. (S. Tomura et al. Clays Clay Miner., 33,200 (1985)). Moreover, the synthesized hallosite can be obtained by leaching feldspar with a Soxhlet extractor or the like (W. E. Parham, Clays Clear Miner., 17, 13 (1969)).

As the swellable phyllosilicate, the above-mentioned ones can be used solely or in a combination of two or more thereof. Among these, montmorillonite, bentonite, hectorite, saponite, swellable mica having sodium ions between layers, and kaolinite are preferable, and especially montmorillonite, bentonite, swellable mica having sodium ions between layers and kaolinite are preferable from the viewpoints of dispersibility in a thermoplastic resin, physical property improving effect to the obtained thermoplastic resin composition, and ease to get.

The above-mentioned swellable phyllosilicate is used solely or in a combination use of two or more thereof. Although the swellable phyllosilicates preferably have a crystal structure with a high purity in which each layer is superposed on another layer regularly in the c-axis direction, there can also be used so-called mixed-layer clay minerals having an irregular crystal cycle and plural kinds of crystal structures.

The organo-silane which is introduced into the above-mentioned swellable phyllosilicates are an organo-silane represented by the general formula (I):

$$Y_n SiX_{4-n} \quad (I)$$

In the general formula (I), n denotes an integer of 0 to 3, Y is a hydrocarbon group having 1 to 25 carbon atoms which may have a substituent.

In the case where the hydrocarbon group having 1 to 25 carbon atoms has a substituent, examples thereof are a group combined with an ester bond, a group combined with an ether bond, an epoxy group, an amino group, a carboxyl group, a group having a carbonyl group on a terminal thereof, an amide group, a mercapto group, a group combined with a sulfonyl bond, a group combined with a sulfinyl bond, a nitro group, a nitroso group, a nitrile group, a halogen atom, a hydroxyl group and the like. The hydrocarbon group may be substituted with one of these substituents or at least two substituents.

X denotes a hydrolyzable group and/or a hydroxyl group. Examples of the hydrolyzable group are at least one selected from the group consisting of an alkoxy group, an alkenyloxy group, a ketoxime group, an acyloxy group, an amino group, an aminoxy group, an amide group and a halogen atom.

In the general formula (I), when n or (4−n) is at least 2, n units of Y or (4−n) units of X may be the same or different.

In this specification, the hydrocarbon groups are linear or branched (that is, having a side chain), saturated or unsaturated, monovalent or polyvalent, aliphatic, aromatic or alicyclic hydrocarbon groups. Examples thereof are an alkyl group, an alkylene group, an alkenyl group, an alkenylene group, an alkynyl group, an alkynylene group, a phenyl group, a phenylene group, a naphtyl group, a naphtylene group, a cycloalkyl group, a cycloalkylene group and the like.

In the general formula (I), examples in which Y is a hydrocarbon group having 1 to 25 carbon atoms are a group having a linear long chain alkyl group such as decyltrimethoxysilane, a group having a lower alkyl group such as methyltrimethoxysilane, a group having a unsaturated hydrocarbon group such as 2-hexenyltrimethoxysilane, a group having an alkyl group with a side chain such as 2-ethylhexyltrimethoxysilane, a group having a phenyl group such as phenyltriethoxysilane, a group having a naphthyl group such as 3-β-naphthylpropyltrimethoxysilane, a group having an aralkyl group such as p-vinylbenzyltrimethoxysilane, and the like. Examples in which Y is a group having a vinyl group among groups having 1 to 25 carbon atoms are vinyltrimethoxysilane, vinyltrichlorosilane, vinyltriacetoxysilane and the like. Examples in which Y is a group having a group substituted with a group combined with an ester bond are γ-methacryloxypropyltrimethoxysilane and the like. Examples in which Y is a group having a group substituted with a group combined with an ether group are γ-polyoxyethylenepropyltrimethoxysilane, 2-ethoxyethyltrimethoxysilane and the like. Examples in which Y is a group substituted with an epoxy group are γ-glycidoxypropyltrimethoxysilane and the like. Examples in which Y is a group substituted with an amino group are γ-aminopropyltrimethoxysilane, γ-(2-aminoethyl)aminopropyltrimethoxysilane, γ-anilinopropyltrimethoxysilane and the like. Examples in which Y is a group substituted with a group having a carbonyl group on a terminal thereof are γ-ureidopropyltrimethoxysilane and the like. Examples in which Y is a group substituted with a mercapto group are γ-mercaptopropyltrimethoxysilane and the like. Examples in which Y is a group substituted with a halogen atom are γ-chloropropyltriethoxysilane and the like. Examples in which Y is a group substituted with a group combined with a sulfonyl bond are γ-phenylsulfonylpropyltrimethoxysilane and the like. Examples in which Y is a group substituted with a group combined with a sulfinyl bond are γ-phenylsulfinylpropyltrimethoxysilane and the like. Examples in which Y is a group substituted with a nitro group are γ-nitropropyltriethoxysilane and the like. Examples in which Y is a group substituted with a nitroso group are γ-nitrosopropyltriethoxysilane and the like. Examples in which Y is a group substituted with a nitrile group are γ-cyanoethyltriethoxysilane, γ-cyanopropyltriethoxysilane and the like. Examples in which Y is a group substituted with a carboxyl group are γ-(4-carboxyphenyl)propyltriethoxysilane and the like.

In the present invention, other than the above-mentioned compound, an organo-silane in which Y is a group having a hydroxyl group can be employed. Examples thereof are N,N-di(2-hydroxyethyl)amino-3-propyltriethoxysilane and the like.

A hydroxyl group can be a form of a silanol group (SiOH).

Among the above-mentioned organo-silane, the compound can be selected to sufficiently increase its reactivity with a swellable phyllosilicate and its compatibility or dispersibility with an obtained silane-treated foliated phyllosilicate and a thermoplastic polyester resin or a dispersion medium such as glycols, which is used in a step of adding a dispersion medium in a preferred process for preparing the polyester resin composition of the present invention, which is mentioned later. However, in the general formula (I), the compound is preferable, in which X is at least one selected from the group consisting of an alkoxy group, a chlorine atom and a hydroxyl group, and Y is a group selected from the group consisting of a group having an amino group as a substituent, a group having an ester group, a group having an ether group, a group having an epoxy group and a group having an amide group. Examples of the organo-silane are γ-aminopropyltrimethoxysilane, γ-aminopropyltriethoxysilane, γ-(2-aminoethyl)aminopropyltrimethoxysilane, γ-(2-aminoethyl)aminopropyltriethoxysilane, γ-methacryloxypropyltrimethoxysilane, γ-methacryloxypropyltrichlorosilane, γ-poly(oxyethylenepropyltrimethoxysilane), 2-ethoxyethyltriethoxysilane, γ-glycidoxypropyltrimethoxysilane, and γ-glycidoxypropyltriethoxysilane.

Substituted products or derivatives of the organo-silane can be also employed. These organo-silane may be used solely or in a combination use of two or more thereof.

The silane-treated foliated phyllosilicate used in the present invention can be obtained, for example, by a process comprising expanding a basal spacing of a swellable phyllosilicate in a dispersion medium and thereafter adding the above-mentioned organo-silane.

As the dispersion medium, examples are water, a polar solvent compatible with water in an arbitrary concentration, and mixed solvent of water and the polar solvent.

Examples of the polar solvent are alcohols such as methanol, ethanol and isopropanol, glycols such as ethylene glycol, propylene glycol and 1,4-butanediol, ketones such as acetone and methyl ethyl ketone, ethers such as diethyl ether and tetrahydrofuran, amide compounds such as dimethylformamide, and other solvents such as dimethyl sulfoxide and 2-pyrrolidone, and the like. These polar solvents may be used solely or in a combination use of two or more thereof.

The basal spacing of the swellable phyllosilicate in the dispersion medium can be expanded by stirring and dispersing the swellable phyllosilicate in the dispersion medium. The basal spacing after expansion is at least three times, preferably at least five times, larger than the initial basal spacing of the swellable phyllosilicate. There is not any upper limit in the basal spacing after expansion. When the basal spacing is expanded as much as ten times, since the swellable phyllosilicate exists substantially in the form of unit layer, there is no need for expanding the basal spacing more than ten times.

The initial basal spacing of the swellable phyllosilicate means a basal spacing in flocculated state in which unit layers are laminated with each other before the basal spacing is expanded in the dispersion medium. It is usually about 7 to 17 Å as mentioned above, though it varies depending upon types of the swellable phyllosilicate.

The basal spacing can be determined by a small angle X-ray diffraction method (SAXS) and the like. Namely, a basal spacing can be calculated by measuring a diffraction peak angle of a dispersion system comprising a dispersion medium and a swellable phyllosilicate with SAXS, and substituting it in the Bragg's formula.

As a method for efficiently expanding the basal spacing of the swellable phyllosilicate, examples thereof are a method of stirring at least thousands rpm and a method of applying physical external forces as mentioned below.

The external forces can be applied by using a conventional pulverizing method of fillers. Examples of the conventional method for pulverizing fillers are a method using hard particles. In this method, the layers are separated from each other by mixing and stirring hard particles, a swellable phyllosilicate and an arbitrary solvent, and then by expanding a basal spacing of the swellable phyllosilicate according to the physical collision of the hard particles and the swellable phyllosilicate. Hard particles conventionally used are beads for pulverizing fillers. For example, glass beads, zirconia beads or the like are employed. These beads for pulverization are selected from the viewpoint of hardness of the swellable phyllosilicate or the material of a stirrer. Therefore, they are not restricted to the glass beads or zirconia beads. The particle size of the beads is also determined in view of the size of the swellable phyllosilicate and the like and is not always limited. But it is preferably 0.1 to 0.6 mm in diameter. There is no particular limitation for the solvent used here, but the above-mentioned dispersion medium is preferable.

After expanding the basal spacing of the swellable phyllosilicate to separate the layers as mentioned above, the above-mentioned organo-silane is added and stirred. A silane cray composite can be obtained by introducing the organo-silane to the surface of the swellable phyllosilicate having expanded basal spacing.

In a method using a dispersion medium, an organo-silane can be introduced by adding the organo-silane to a dispersion system containing a swellable phyllosilicate having an expanded basal spacing and a dispersion medium. When the organo-silane is intended to be introduced more efficiently, a rotation rate in stirring is set to at least 1000 rpm, preferably 1500 rpm, more preferably 2000 rpm, or a shear rate of at least 500 (1/s), preferably at least 1000 (1/s), more preferably at least 1500 (1/s) is applied by using a wet mill or the like. The upper limit of the rotation rate is about 25,000 rpm and that of shear rate is about 500,000 (1/s). Stirring at larger value than the upper limit or applying a shear rate greater than the upper limit tends to no longer improve effects any more. There is no need of stirring at greater values than those upper limits, therefore.

In the method using a physical external force, the organo-silane can be introduced by applying a physical external force to a swellable phyllosilicate (for example, with wet pulverization) and concurrently adding an organo-silane thereto.

Alternatively, an organo-silane can also be introduced to a swellable phyllosilicate by adding a swellable phyllosilicate having a basal spacing expanded with a physical external force into a dispersion medium and thereafter adding the organo-silane thereto in the same manner as in the method using the above-mentioned dispersion medium.

The reaction of a hydroxyl group on the surface of the swellable phyllosilicate with a hydrolyzable group or a hydroxyl group of an organo-silane (X in the formula (I)) can introduce the organo-silane to the swellable phyllosilicate. Although the reaction between the swellable phyllosilicate and the organo-silane can proceed sufficiently at a room temperature, the reaction system may be heated if necessary. The maximum temperature in heating can be arbitrarily set as long as it is lower than the decomposition temperature of the organo-silane to be used and is lower than the boiling point of the dispersion medium.

In the present invention, "introducing an organo-silane to a swellable phyllosilicate" means reacting and combining a hydrolyzable group and/or a hydroxyl group of the organo-silane with a hydroxyl group of a swellable phyllosilicate having an expanded basal spacing, and thereby making an organo-silane present on surface and interlayer spaces of the swellable phyllosilicate.

Moreover, when the introduced organo-silane has a reactive functional group such as a hydroxyl group, a carboxyl group, an amino group, an epoxy group, a vinyl group or the like, it can be further reacted by adding a compound reacting with the reactive functional group of the organo-silane. By the second reaction, it is possible to extend a functional group chain length of the organo-silane introduced to the swellable phyllosilicate or to change its polarity. The compound added in the second reaction is not limited to an organo-silane; arbitrary compounds can be used in accordance to objects. Examples of these compounds are a compound containing an epoxy group, a compound containing an amino group, a compound containing a carboxyl group, a compound containing an acid anhydride group and a compound containing a hydroxyl group.

The reaction can proceed sufficiently at a room temperature, it may be heated if necessary. The maximum temperature in heating can be arbitrarily set as long as it is lower than the decomposition temperature of the used organo-silane and is lower than the boiling point of the dispersion medium.

An amount of the organo-silane can be adjusted in order to increase compatibility with a silane-treated foliated phyllosilicate and glycols and a polyester resin, and dispersibility of the silane-treated foliated phyllosilicate. If necessary, plural types of organo-silane having different types of a functional group can be used together. The amount of the organo-silane can not always be limited using a value, but it is preferably 0.1 to 200 parts, more preferably 0.2 to 160 parts, and particularly preferably 0.3 to 120 parts based on 100 parts by weight (hereinafter referred to as "parts") of a swellable phyllosilicate. When the amount of the organo-silane is less than 0.1 part, a silane-treated foliated phyllosilicate tends not to be dispersed finely enough in the polyester resin composition. When it exceeds 200 parts, the effects do not change.

The basal spacing of the silane-treated foliated phyllosilicate obtained in the above-mentioned manner can be expanded in comparison with the initial basal spacing of the swellable phyllosilicate by the presence of the introduced organo-silane. For example, the swellable phyllosilicate dispersed in a dispersion medium and having a basal spacing returns to the state where layers are flocculated together again, when the organo-silane is not introduced and the dispersion medium is removed. According to the present invention, since a basal spacing is expanded and then an organo-silane is introduced, a silane-treated foliated phyllosilicate obtained after removal of the dispersion medium can exist in a state where layers do not flocculate together and the basal spacing are still expanded. The silane-treated foliated phyllosilicate has an expanded basal spacing expanded at least 1.3 times, preferably at least 1.5 times, more preferably at least 1.7 times, especially preferably at least 2.0 wider than the initial basal spacing of the swellable phyllosilicate. There is no particular limitation for the upper limit, but even if the basal spacing is expanded 5 times wider, the effects are no longer improved.

Thus, the introduction of the organo-silane provides the effect of controlling flocculation of particles of the silane-treated foliated phyllosilicate. And the expansion of the basal spacing can increase the compatibility of the silane-treated foliated phyllosilicate with the glycol compound and, as a result, the dispersibility of the silane-treated foliated phyllosilicate in the polyester resin in the dispersion system preparation step as the step (B) in the preparation process of the present invention.

Although the introduction of the organo-silane is confirmed by various methods, the following is a concrete example thereof.

First, an organo-silane merely adsorbed to the silane-treated foliated phyllosilicate is sufficiently washed away with an organic solvent such as tetrahydrofuran and chloroform. The silane-treated foliated phyllosilicate after washing is ground into powder with mortar or the like and thereafter is sufficiently dried. The resulting powder is sufficiently mixed with a matrix material such as powdery potassium bromide (KBr) in a predetermined amount and formed into a pellet by pressing. Absorption bands derived from the organo-silane introduced in the silane-treated foliated phyllosilicate is then measured by the Fourier transfer infrared spectroscopy (FT-IR) in a transmission mode or the like. When more accurate measurement is required or when the amount of the organo-silane introduced is small, it is preferable that the sufficiently dried powdery organo-silane composite is directly measured by the diffusion reflection method (DRIFT).

Furthermore, the silane-treated foliated phyllosilicate having a basal spacing and expanded wider than the initial basal spacing of the swellable phyllosilicate can be confirmed by various methods. A concrete method is as follows.

A basal spacing of a silane-treated foliated phyllosilicate can be measured using the small-angle X-ray diffraction method (SAXS) or the like after washing away an organo-silane merely adsorbed to the silane-treated foliated phyllosilicate with an organic solvent in the same manner as mentioned above and thereafter drying the resultant. In this method, a value of the diffraction peak derived from the (001) plane of the powdery silane-treated foliated phyllosilicate is measured by using the SAXS and then the value is substituted to the Bragg's formula to calculate a basal spacing. A basal spacing of the swellable phyllosilicate is calculated in the same manner. Comparison of these basal spacings can confirm that the basal spacing is expanded.

As mentioned above, after washing with an organic solvent, a functional group derived from the organo-silane is observed with FT-IR or the like. And the formation of the silane-treated foliated phyllosilicate can be confirmed by measuring that a basal spacing is expanded wider than the swellable phyllosilicate using SAXS or the like.

As mentioned above, the formation of the silane-treated foliated phyllosilicate can be confirmed by confirming both the introduction of the organo-silane and the expansion of the basal spacing. Thus, according to the present invention, the introduction of the organo-silane and the expansion of the basal spacing can increase compatibility between the silane-treated foliated phyllosilicate and the polyester resin or the glycol compound.

In the polyester resin composition of the present invention, an amount of the silane-treated foliated phyllosilicate is adjusted to 0.1 to 50 parts, preferably 0.2 to 45 parts, more preferably 0.3 to 40 parts particularly preferably 0.4 to 35 parts, and especially preferably 0.5 to 30 parts based on 100 parts of the polyester resin. When the amount of the silane-treated foliated phyllosilicate is less than 0.1 part, mechanical properties, deflection temperature under load and dimensional stability are not sufficiently improved. When it exceeds 50 parts, there is a tendency that appearance of molded articles, fluidity during molding and the like become worse.

The ash content of the polyester resin composition derived from the silane-treated foliated phyllosilicate is adjusted to typically 0.1 to 30% by weight (hereinafter referred to as "%"), preferably 0.2 to 28%, more preferably 0.3 to 25%, particulary preferably 0.4 to 23%, especially preferably 0.5 to 20%. When the ash content is less than 0.1%, mechanical properties, deflection temperature under load and dimensional stability are not sufficiently improved. When it exceeds 30%, there is a tendency that appearance of molded articles, fluidity during molding and the like becomes worse.

A structure of the silane-treated foliated phyllosilicate dispersed in the polyester resin composition of the present invention is quite different from the $\mu$m-sized flocculated structure possessed by the swellable phyllosilicate before incorporation, in which a lot of layers are laminated. Namely, by using a silane-treated foliated phyllosilicate in which an organo-silane having compatibility with a matrix has been introduced and a basal spacing has been expanded wider than that of the initial swellable phyllosilicate, its layers are further exfoliated from each other. As a result, the silane-treated foliated phyllosilicate is dispersed in the polyester resin composition in a state of very fine, independent and laminars, and the number thereof remarkably increases in comparison with the swellable phyllosilicate as the raw material. Such a dispersing condition of the laminar can be expressed by a maximum layer thickness, an average layer thickness, the number of dispersing particles [N], an aspect ratio (layer length/layer thickness ratio) and a parameter mentioned later of the silane-treated foliated phyllosilicate.

First, the lower limit of the maximum layer thickness of the silane-treated foliated phyllosilicate in the polyester resin composition of the present invention is more than 100 Å, preferably at least 150 Å, more preferably at least 200 Å, particularly preferably at least 300 Å, especially preferably at least 400 Å. When the thickness of the maximum layer dispersing in the polyester resin composition is at most 100 Å, there is a tendency that mechanical properties, deflection temperature under load and dimensional stability of the molded articles obtained from the polyester resin composition of the present invention are not sufficiently improved. Moreover, the upper limit thereof is 2000 Å, preferably 1800 Å, more preferably 1500 Å, particularly preferably 1200 Å, especially preferably 1000 Å. When the upper limit of the layer thickness of the silane-treated foliated phyllosilicate is more than 2000 Å, the surface of a molded article obtained from the polyester resin composition of the present invention is sometimes lost.

The lower limit of the average layer thickness of the silane-treated foliated phyllosilicate in the polyester resin composition of the present invention is at least 20 Å, preferably at least 30 Å, more preferably at least 50 Å, particularly preferably at least 60 Å, especially preferably at least 70 Å. The upper limit of the average layer thickness of the silane-treated foliated phyllosilicate is at most 500 Å, preferably at most 450 Å, more preferably at most 400 Å, particularly preferably at most 350 Å, especially preferably at most 300 Å. When the average thickness layer is in the above-mentioned range, mechanical properties, deflection temperature under load and dimension stability can be improved without losing an appearance of the molded article obtained from the polyester resin composition of the present invention.

Defining the number average of layer length/layer thickness ratio of the silane-treated foliated phyllosilicate dispersing in the polyester resin as an average aspect ratio, the average aspect ratio of the silane-treated foliated phyllosilicate in the polyester resin composition of the present invention is 10 to 300, preferably 15 to 300, more preferably 20 to 300. When the average aspect ratio of the silane-treated foliated phyllosilicate is less than 10, there may be a case that modulus of elasticity, deflection temperature under load of the polyester resin composition of the present invention are not sufficiently improved. Since the effects are no longer improved even if the average aspect ratio exceeds 300, there is no need for setting the average aspect ratio more than 300.

Defining the number of the dispersing particles based on unit weight proportion of the swellable phyllosilicate in a 100 $\mu m^2$ area of the polyester resin composition as the value [N], the [N] value of the silane-treated foliated phyllosilicate in the polyester resin composition of the present invention is at least 30, preferably at least 45, more preferably at least 60. There is no particular limitation for the upper limit, but when the [N] value exceeds about 1,000, the effect is no longer improved. Therefore, there is no need for setting the [N] value more than 1,000.

The above-mentioned parameter of the polyester resin composition of the present invention can be expressed as follows. Namely, when a proportion of the number of the silane-treated foliated phyllosilicate having a layer thickness of more than 100 Å and not more than the upper limit of the above-mentioned maximum layer thickness among the silane-treated foliated phyllosilicate dispersing in the polyester resin composition is defined as [R100], the [R100] value in the polyester resin composition of the present invention is at least 10%, preferably at least 20%, more preferably at least 30%, particularly preferably at least 40%, especially preferably at least 50%. When the [R100] value is at least 10%, mechanical properties, deflection temperature under load and dimensional stability of the molded articles obtained from the polyester resin composition of the present invention can be further improved without losing an appearance of the molded article. Although there is no particular limitation for the upper limit, when the [RL100] value is at least 80%, the effect is no longer improved.

In the polyester resin composition of the present invention, when a proportion of the number of the silane-treated foliated phyllosilicate having a layer thickness of at least 200 Å and not more than the upper limit of the maximum layer thickness among the silane-treated foliated phyllosilicate dispersing in the polyester resin composition is defined as [R200], the [R200] value in the polyester resin composition of the present invention is at least 0.3×[R100]%, preferably at least 0.4×[100]%, more preferably 0.5× [R100]%, particularly preferably at least 0.6×[100]%, especially preferably at least 0.7×[R100]%. When the [R200] value is at least 0.3×[R100]%, mechanical properties, deflection temperature under load and dimensional stability of the polyester resin composition are further improved. Although there is no particular limitation for the upper limit, when the [R200] value is at least 0.85×[R100]%, the effect is no longer improved.

In the polyester resin composition of the present invention, when a proportion of the number of the silane-treated foliated phyllosilicate having a layer thickness of at least 300 Å and not more than the above-mentioned upper-limit among the silane-treated foliated phyllosilicate dispersing in the polyester resin composition is defined as [R300], the [R300] value in the polyester resin composition of the present invention is at least 0.4×[R200]%, preferably at least 0.5×[R200]%, more preferably at least 0.6×[R200]%, particularly preferably at least 0.7×[R200]%, especially preferably at least 0.8×[R200]%. When the [R300] value is at least 0.4×[R100]%, mechanical properties, deflection temperature under load and dimensional stability of the polyester resin composition are further improved. Although there is no particular upper limit, when the [R300] value is at least 0.95×[R200] %, the effect is no longer improved.

If the silane-treated foliated phyllosilicate is dispersed in a state of the above-mentioned layer thickness, the polyester resin composition can maintain high modulus since the composite gives isotropic properties to the polyester resin composition and the composite itself is not distorted. Since the silane-treated foliated phyllosilicate having such a layer thickness is contained in the polyester resin composition in the above-mentioned amount, mechanical properties, deflection temperature under load and dimensional stability of molded articles are sufficiently improved without losing an appearance thereof.

In this specification, the layer thickness can be determined from images, taken by using a microscope or the like, of films obtained by hot press molding or drawing after heating and melting the polyester resin composition of the present invention, or thin articles obtained by injection molding of the molten resin.

Namely, it is assumed that a film prepared according to the above-mentioned method or a thin plate-like test piece obtained by injection molding having a thickness approximately 0.5 to 2 mm is placed on an X-Y plane. The layer thickness can be determined by cutting the film or the plate along an X-Z or Y-Z plane into a thin layer and observing the thin layer at high magnifications as high as approximately at least forty thousand to one hundred thousand. Instead of the above-mentioned film or plate, the layer thickness can also be determined by cutting, perpendicularly to the drawing axis, a fibrilar material obtained by monoaxially drawing into a thin layer and observing it with a transmission electron microscope. The layer thickness can be qualified, for example, by forming a picture image using an image processing device from the image obtained by the transmission electron microscope and processing the picture image with a computer. Alternatively, in the case where the transmission electron microscope has a sufficiently high magnification, for example, one hundred thousand times, it can also be determined by measuring with a ruler or the like without using the image processing devices. Therefore, in the present invention, a layer thickness of the silane-treated foliated phyllosilicate can be qualified, for example, by using a photograph showing the dispersion state of the silane-treated foliated phyllosilicate obtained by taking a photograph of the polyester resin composition of the present invention with a transmission electron microscope.

In this specification, the maximum layer thickness means the maximum of layer thickness of the silane-treated foliated phyllosilicate detected by choosing an arbitrary region, in which at least 100 dispersing layers of the silane-treated foliated phyllosilicate is contained in a transmission electron microscope image obtained by the above-mentioned method or the like. The average layer thickness means a value obtained by a number averaging the layer thickness of the silane-treated foliated phyllosilicate measured in the area as mentioned above.

A proportion of the number of the silica clay composite having a layer thickness of at least 100 Å, [R100], can be obtained by choosing an arbitrary region containing at least 100 of dispersing layers of the silane-treated foliated phyllosilicate in the same manner as the measurement of the average layer thickness and measuring a layer thickness of every dispersing layer.

The [N] value can be obtained, for example, by the following method. Namely, the [N] value can be obtained in such a manner that a polyester resin composition is cut into an ultrathin section of about 50 μm to 100 μm thickness and the number of particles of the silane-treated foliated phyllosilicate present in an arbitrary 100 μm² region in an image of the ultrathin section taken by means of TEM or the like is divided by the weight ratio of the used swellable phyllosilicate. Alternatively, the [N] value may also be defined by a value obtained in such a manner that the number of particles present in an arbitrary region (its area is previously measured), in which at least 100 of the particles are present, is chosen in the TEM image, and divided by the weight ratio of the used swellable phyllosilicate and the resulting number is converted to the number for a 100 μm² area. Accordingly, the [N] value can be qualified by using a TEM photograph of a polyester resin composition, or the like.

The thermoplastic polyester resin composition of the present invention containing a silane-treated foliated phyllosilicate, which is dispersed in a laminar form in the dispersing state, can be prepared by, in a dispersion system containing a previously prepared silane-treated foliated phyllosilicate and polymerizable monomers forming a polyester resin, polymerizing the polymerizable monomer, and preferably prepared by the following method.

A process for preparing a polyester resin composition comprising a thermoplastic polyester resin and a silane-treated foliated phyllosilicate of the present invention comprises a preparation step (A) of the silane-treated foliated phyllosilicate, a preparation step (B) of the dispersion system (B), a preparation step (C) of the mixture and a molecular weight increasing step (D), as mentioned above.

The present invention is explained below in the above order of the steps.

First, in the step (A) in the present invention, a silane-treated foliated phyllosilicate is prepared by introducing an organo-silane composition represented by the general formula (I):

$$Y_nSiX_{4-n} \qquad (I)$$

wherein n denotes an integer of 0 to 3, Y denotes a hydrocarbon group having 1 to 25 carbon atoms which may have a substituent, X denotes a hydrolyzable group or a hydroxyl group, n units of Y or (4−n) units of X may, respectively, be the same or different if n or (4−n) is at least 2, to the above-mentioned swellable phyllosilicate.

As the step (B) of the process for preparing the polyester resin composition of the present invention, the above-mentioned silane-treated foliated phyllosilicate and glycols are mixed to prepare a glycol dispersion system.

As the glycols used in the present invention, examples are aliphatic glycols such as ethylene glycol, propylene glycol, butylene glycol, hexylene glycol and neopentyl glycol, alicyclic glycols such as 1,4-cyclohexane dimethanol, and aromatic glycols such as 1,4-phenylenedioxy dimethanol. Substituted products and derivatives thereof can be also employed. Cyclic esters such as ε-caprolactone can be also employed. These may be used solely or in a combination use of two or more thereof. Moreover, at least one selected from, for example, long chain diols such as poly(ethylene glycol) and poly(tetramethylene glycol) and, for example, alkylene oxide adduct polymers of bisphenols such as ethylene oxide-adduct polymers of bisphenol-A and the like can be mixed in such a small amount that the modulus of elasticity of the polyester resin is not remarkably decreased.

As for a mixing ratio of the glycols and the silane-treated foliated phyllosilicate, there is no requirement except that the amount of the silane-treated foliated phyllosilicate is 0.5 to 50 parts based on 100 parts of the glycols. It is preferably 0.5 to 40 parts, more preferably 0.5 to 30 parts from the viewpoint of dispersibility of the silane-treated foliated phyllosilicate.

There is no particular limitation for a method of the above-mentioned dispersion system preparing step (B). Examples thereof include: when glycols are used as a dispersion medium in the silane-treated foliated phyllosilicate preparing step (A) a method in which a system containing the dispersion medium and the silane-treated foliated phyllosilicate is used as a glycol dispersion system (this method is referred to as a direct method; in this case, the silane-treated foliated phyllosilicate preparing step (A) also serves as the dispersion system preparing step (B)); a method in which to a system containing a dispersion medium and a silane-treated foliated phyllosilicate obtained in the preparation of the silane-treated foliated phyllosilicate is mixed desired glycols and then, if necessary, the dispersion medium is removed to use glycols as a dispersion medium (this method is referred to as a substitution method); or a method in which a silane-treated foliated phyllosilicate previously prepared and glycols are sufficiently mixed. From the viewpoint of dispersibility of the silane-treated foliated phyllosilicate, the direct method and the substitution method are preferable.

In order to mix efficiently, a rotation rate in stirring is set to be at least 500 rpm or a shear rate of at least 300 (l/s) is applied. The upper limit of the rotation rate is 25,000 rpm and that of the shear rate is 500,000 (l/s). Since stirring at values over the upper limit tends to remain the same effect, there is no need for stirring at the value over the upper limits.

In the silane-treated foliated phyllosilicate contained in the glycol dispersion system obtained in the above-mentioned manner, the initial lamination/flocculation structure, which the swellable phyllosilicate possess, disappears and the silane-treated foliated phyllosilicate is led to a so-called swollen state in which spacing between layers are expanded. As an index for expressing the swollen state, a basal spacing can be used. That is, a basal spacing of the silane-treated foliated phyllosilicate in the glycol dispersion system obtained in the dispersion system preparing step (B) is at least three times, preferably at least four times, more preferably at least five times larger than the initial basal spacing of the swellable phyllosilicate. When the basal spacing is less than three times, the silane-treated foliated phyllosilicate tends not to finely disperse efficiently in a polyester resin composition obtained according to the preparing process of the present invention.

There is no particular limitation for the upper limit, but even if the basal spacing is expanded at least ten times, the effect is no longer improved.

Next, as the step (C) of the process for preparing the polyester resin composition of the present invention can be carried out a step in which the dispersion system is added to a molten polyester unit and/or a polyester having a low polymerization degree to obtain a mixture.

In the present invention, the "polyester unit" means a condensate formed from one molecule of an aromatic dicarboxylic acid or its ester formable derivative and one molecule of glycols or its ester formable derivative. The "polyester having a low polymerization degree" means a condensate comprising an aromatic dicarboxylic acid or its ester formable derivative and glycols or its ester formable derivative. Moreover, the polyester unit and the polyester having a low polymerization degree are ones having a molecular weight corresponding to such melt viscosity that the dispersion system containing the silane-treated foliated phyllosilicate can be dispersed in a molten state sufficiently and uniformly.

From the viewpoint of uniform dispersibility of the glycol dispersion system, the polyester unit and/or the polyester having a low polymerization degree have a logarithmic viscosity of less than 0.4 (dl/g), preferably less than 0.38 (dl/g), more preferably less than 0.35 (dl/g), particularly preferably less than 0.33 (dl/g) and especially preferably less than 0.30 (dl/g). There is no particular limitation for the lower limit, but it is preferably 0.001 (dl/g).

Examples of the aromatic dicarboxylic acids are terephthalic acid, isophthalic acid, orthophthalic acid, 2,5-naphthalene dicarboxylic acid, 4,4'-biphenyl dicarboxylic acid, 4,4'-diphenyl ether dicarboxylic acid, 4,4'-diphenylmethane dicarboxylic acid, 4,4'-diphenylsulfone dicarboxylic acid, 4,4'-diphenylisopropylidene dicarboxylic acid and the like, their substituted product, their derivative, oxyacids such as p-oxybenzoic acid and p-hydroxyethoxybenzoic acid, and their ester formable derivative. These monomers may be used solely or in a combination use of two or more thereof.

At least one aliphatic dicarboxylic acid such as adipic acid, azelaic acid, dodecane dicarboxylic acid and sebacic acid can be used with these aromatic dicarboxylic acids in a small amount that characteristics of the obtained polyester resin composition are not lost.

As the glycols, the same one as those used in the dispersion system preparing step (B) can be used. At least one compound listed as an example can be used.

There is no particular limitation for a method for obtaining the polyester unit and/or the polyester having a low polymerization degree. Examples are conventional methods such as a method in which an aromatic dicarboxylic acid is esterified with glycols, a method in which an aromatic dicarboxylic acid alkyl ester and glycols are transesterified, and the like.

In addition to a method in which the compounds are obtained by condensation reacting an aromatic dicarboxylic acid or its ester formable derivative with glycols or its ester formable derivative, example thereof is a method in which the target compounds are obtained by depolymerizing a part of or the whole of a polyester resin with glycols. Namely, examples are a method in which a mixture of a polyester resin and glycols as a raw material is heated, and depolymerized with stirring at about 150° C. to about a melting point of the polyester resin, a method in which a polyester resin as a raw material is previously melt, depolymerization is carried out by adding glycols thereto under stirring, and the like.

A catalyst needed in the reaction for obtaining the above polyester unit and/or the polyester having a low polymerization degree is a transesterification catalyst, and at least one kind of metal oxides, carbonates, acetates, alcoholates and the like can be used. In the method for obtaining the target compounds by depolymerization of a polyester resin, although a catalyst required for the reaction is usually contained previously in the polyester resin as the starting material, the above-mentioned transesterification catalyst may be additionally used if necessary.

As the glycols used in the depolymerization of the polyester resin, there can be used at least one kind of those previously mentioned as the glycols used in the dispersion system preparing step.

In this case, when a resin component contained in the polyester resin composition obtained by the preparing process of the present invention is formed into a copolymerized polyester resin obtained by copolymerizing a polyester resin as a raw material with the other glycols, glycols having a structure different from that of the glycols used in the dispersion system preparing step (B) is used for the depolymerization of the polyester resin as a raw material.

There is no particular limitation for a method of the mixture preparing step (C) in the preparation process of the present invention. Example is a method in which to the polyester unit and/or the polyester having a low polymerization degree obtained by the above-mentioned method in a molten state is continuously added a glycol dispersion system. The addition can be carried out at an arbitrary timing during the reaction as long as a logarithmic viscosity of the polyester unit and/or the polyester having a low polymerization degree is less than 0.4 (dl/g), preferably less than 0.38 (dl/g), more preferably less than 0.35 (dl/g), particularly preferably less than 0.33 (dl/g). When the logarithmic viscosity is at least 0.4 (dl/g), there is a tendency that the silane-treated foliated phyllosilicate is insufficiently finely dispersed.

An amount of the glycol dispersion system added to 100 parts of the polyester unit and/or the polyester having a low polymerization degree in a molten state is required to be 1 to 500 parts. But it is preferably 2 to 400 parts, more preferably 5 to 300 parts.

In the step (C) of the preparation process of the present invention, at least one compound selected from the group consisting of an aromatic dicarboxylic acid or its ester formable derivative and glycols or its ester formable derivative may be added to the polyester unit and/or the polyester having a low polymerization degree in a molten state, as long as a logarithmic viscosity is in the above-mentioned range.

Next, as the step (D) of the process for preparing the polyester resin composition of the present invention, the molecular weight increasing step is carried out, in which the polyester unit and/or the polyester having a low polymerization degree present in the mixture obtained in the previous step (C) by a condensation polymerization reaction.

There is no particular limitation for a method for increasing molecular weight and it can be carried out by conventional polymerization methods of polyester resins.

As these methods, examples are a method in which a mixture obtained in the above-mentioned mixture preparing step (C), containing the silane-treated foliated phyllosilicate, the glycols and the polyester unit and/or the polyester having a low polymerization degree in a molten state is stirred, the excess glycols are removed from the system and thereafter a pressure of the system is reduced to carry out melt condensation polymerization, a method in which the system is cooled to solidify at an arbitrary timing from before or after the beginning of the melt condensation polymerization to the completion of polymerization, the resultant is pulverized, preliminarily crystallized, dried, and thereafter heated to 150° C. to a melting point to carry out a solid phase polymerization, and the like.

When the other glycols is copolymerized with the polyester resin component, the target product is obtained by adding and mixing desired glycols at an arbitrary timing during the melt condensation polymerization, and thereafter carrying out the melt condensation polymerization reaction.

As a catalyst required for the above-mentioned condensation polymerization reaction, there can be used at least one kind of metal oxides, carbonates, acetates, alcoholates and the like.

A molecular weight of the polyester resin whose molecular weight has been increased in the step (D) is in such a range that a logarithmic viscosity measured at 25° C. using a phenol/tetrachloroethane (5/5 weight ratio) mixed solvent is 0.4 to 2.0 (dl/g), preferably 0.42 to 1.9 (dl/g), more preferably 0.45 to 1.8 (dl/g). When the logarithmic viscosity is less than 0.4 (dl/g), mechanical properties tend to be low. When the logarithmic viscosity is larger than 2.0 (dl/g), molding fluidity tends to be low because of high melt viscosity.

The reason why the polyester resin composition of the present invention is excellent in mechanical properties, heat resistance, dimension stability, surface appearance and moldability is that the silane-treated foliated phyllosilicate is dispersed in the resin in the form of many fine laminar particles, and a maximum layer thickness, an average layer thickness, the number of dispersing particles, an average aspect ratio and the like of the silane-treated foliated phyllosilicate are in the above-mentioned ranges.

The dispersing state of the silane-treated foliated phyllosilicate can be controlled by at least one step selected from the group consisting of the silane-treated foliated phyllosilicate preparing step (A), the dispersion system preparing step (B) and the mixture preparing step (C).

That is, for example, if a stirring force or a shearing force is constant during dispersing the swellable phyllosilicate in the step (A), swollen and exfoliated states of the swellable phyllosilicate vary depending upon the type of the dispersion medium, and in the case of using a plurality of dispersion mediums, mixing proportion and mixing order thereof. For example, when montmorillonite is used as the swellable phyllosilicate, montmorillonite is swollen and exfoliated into states similar to unit layers. Therefore, when it is reacted with an organo-silane having a group having high polarity such as an amino group, a mercapto group and a nitrile group at such states, a system can be prepared, in which a silane-treated foliated phyllosilicate having a thickness close to a unit layer thickness is dispersed. On the other and, when a mixed solvent of water and a polar solvent such as ethanol, tetrahydrofuran (THF), methyl ethyl ketone (MEK) or N-methylpyrrolidone (NMP) is used as a dispersion medium or when montmorillonite is dispersed in the polar solvent and thereafter water is added, it is exfoliated and finely divided into a state wherein about several to about one hundred and several tens flakes of unit layers are laminated. When it is reacted with an organo-silane in the state, a system can be prepared in which a silane-treated foliated phyllosilicate having a thickness corresponding to about several to about one hundred and several tens unit layers is dispersed. The dispersing state of the silane-treated foliated phyllosilicate can be controlled by conducting the steps (B), (C) and (D) in order to maintain the state.

In the substitution method in the step (B) (a method in which the dispersion medium used in the preparation of the silane-treated foliated phyllosilicate is substituted with desired glycols), the dispersing state of the silane-treated foliated phyllosilicate in a glycol dispersion system changes depending upon the type of the added glycols, and in the case of using a plurality of glycols, mixing proportion and mixing order thereof. For example, when, for example, ethylene glycol or 1,4-butanediol is added to a water matrix system containing a silane-treated foliated phyllosilicate in a unit layer state to substitute the water, about several to about several tens laminars of the silane-treated foliated phyllosilicate in the unit layer state can flocculate and be laminated. The dispersing state can be controlled by conducting the steps of (C) and (D) of the preparing process of the present invention in order to maintain the state.

In the step (C), the dispersing state varies depending upon a type and a molecular weight of the polyester unit and/or the polyester having a low polymerization degree to be mixed with a glycol dispersion system. For example, in the case where the organo-silane has an amino group, especially bishydroxyethyl terephthalate (BHET) or bishydroxybutyl terephthalate (BHBT) among all polyester units is mixed with the glycol dispersion system, a layer thickness of the silane-treated foliated phyllosilicate does not almost change before and after mixing and polymerization can be carried out with maintaining the dispersing state. On the other hand, continuous addition of a glycol dispersion system to a polyester having a low polymerization degree with a logarithmic viscosity of approximately 0.05 to 0.20 (dl/g) can form a laminate having about several to about several tens layers. The dispersing state can be controlled by conducting the step (D) in order to maintain the state.

To the polyester resin composition of the present invention can be added polybutadiene, a copolymer of butadiene and styrene, an acrylic rubber, an ionomer, a copolymer of ethylene and propylene, a copolymer of ethylene, propylene and diene, a natural rubber, a chlorinated butyl rubber, a homopolymer of α-olefin, a copolymer of at least two α-olefins (including any copolymers such as random, block and graft; mixtures thereof are also permitted), or impact modifiers such as an olefinic elastomer. These may be modified with an acid compound such as maleic anhydride or an epoxy compound such as glycidyl methacrylate.

Unless properties such as mechanical properties and moldability are lost, there can be used thermoplastic resins or unsaturated polyester resins such as a copolymer of poly(ester ether), a polycarbonate resin, a polyestercarbonate resin, a liquid crystal polyester resin, a polyolefinic resin, a polyamide resin, a styrenic resin reinforced with a rubber polymer, a poly(phenylene ether) resin, a polyacetal resin, a polysulfone resin, a polyarylate resin, a polyimide and a polyetherimide, thermosetting resins such as epoxy resin and a phenolnovolac resin. These may be used solely or in a combination use of two or more thereof.

Moreover, according to an object, there can be added additives such as a pigment, a dye, a heat stabilizer, an antioxidant, a ultraviolet absorbers, an optical stabilizer, a lubricant, a plasticizer, a flame retardant and an antistatic agents. The polyester resin composition obtained by the present invention can be formed by an injection molding or a hot press molding, and blow molding is also applicable. Molded articles obtained from the polyester resin composition of the present invention are excellent in appearance, mechanical properties, heat deflection resistance and the like. Therefore, they can be suitably used for automobile parts, household electrical appliances, housewares, wrapping materials, and other general industrial materials.

The present invention is explained in further detail below referring to examples, but the invention is not limited thereto.

First, major raw materials used in Examples and Comparative Examples are shown all together below. Unless otherwise specified, raw materials were not purified.
(Swellable Phyllosilicate)
Smectite group clay minerals: Natural montmorillonite produced in Yamagata Prefecture. (Basal spacing=1.3 nm)
Swellable mica prepared in the following manner was used.
  Synthesis of swellable mica: 28.2 g of swellable mica was obtained by mixing 25.4 g of talc and 4.7 g of sodium silicofluoride and heating at 800° C. (Basal spacing=1.2 nm)
(Organo-silane)
γ-(2-Aminoethyl)aminopropyltrimethoxysilane: A-1120 available from Nihon Unicar. Co., Ltd.
γ-Glycidoxypropyltrimethoxysilane: A-187 available from Nihon Unicar Co., Ltd.
γ-(Polyoxyethylene)propyltrimethoxysilane: A-1230 available from Nihon Unicar Co., Ltd.
(Glycols)
Ethylene glycol: monoethylene glycol available from Nippon Shokubai Co., Ltd. (hereinafter referred to as "EG")
1,4-Butanediol: 1,4-butanediol available from Tosoh Corp. (heneinafter referred to as "1,4-BD")
(Thermoplastic Polyesters)
PET: PBK2 available from Kanebo, Ltd. (poly(ethylene terephthalate), a logarithmic viscosity (ηinh)=0.63 (dl/g)) (hereinafter referred to as "PET")
PBT: PBT120 available from Kanebo, Ltd. (poly(butylene terephthalate), a logarithmic viscosity (ηinh)=0.82 (dl/g)) (hereinafter referred to as "PBT")

Next, evaluation methods in Examples and Comparative Examples are shown all together below.
(FT-IR)
A washing operation was repeated three times, which comprises adding 1.0 g of a silane-treated foliated phyllosilicate to 50 ml of tetrahydrofuran (THF), stirring for 15 minutes to wash and remove an adsorbed organo-silane and thereafter conducting centrifugation to remove a supernatant. After washing, about 1 mg of the fully dried silane-treated foliated phyllosilicate and about 200 mg of KBr powder were sufficiently mixed with a mortar, and thereafter a KBr disk for measurement was prepared with a bench press machine. The disk was measured in a transmission mode using an infrared spectrometer (8100M manufactured by Shimadzu Corp.) As a detector was used an MCT detector. A resolution and the number of scanning were set 4 $cm^{-1}$ and 100 times, respectively.
(Logarithmic Viscosity)
After the obtained polyester resin composition was dried at 140° C. for 4 hours, about 100 mg of the composition was weighted accurately to dissolve it at 120° C. by mixing with 20 ml of a phenol/1,1,2,2-tetrachloroethane (1/1 weight ratio) mixed solvent. Using an Ubbellohde viscometer, a viscosity of a solution was measured at a measuring temperature of 25° C. in the case of using PET or at a measuring temperature of 20° C. in the case of using PBT using an automatic viscosity measuring machine (Viscotimer manufactured by Lauda AG). A logarithmic viscosity (ηinh) was calculated from the following formula:

$$\eta inh = \{ln(t/t_0)\}/C$$

wherein t denotes a value of falling time of a solution, t0 denotes a value of falling time of a mixed solvent only, and C denotes a concentration (g/dl).
(Measurement of basal spacing by small-angle X-ray Diffraction Method (SAXS))
Using an X-ray generator (RU-200B manufactured by Rigaku Denki Kabushiki Kaisha), a basal spacing was measure under the following measuring conditions: target CuKα beam, Ni filter, voltage 40 kV, electric current 300 mA, scanning angle 2θ=0.2 to 16.0°, and a step angle=0.02°.

A basal spacing was calculated by substituting a small-angle X-ray peak angle into the Bragg's formula. When it was difficult to identify a small-angle X-ray peak angle, it was considered that layers were fully exfoliated and crystallinity was completely lost or that since the peak angle value was at most about 0.8° the identification was difficult. Thus, the evaluation result of a basal spacing was expressed as >100 Å.
(Transmission Electron Microscope (TEM))
A film of a polyester resin composition (film thickness: 100 to 300 μm) was prepared under conditions of a temperature of 250 to 270° C. and a gauge pressure of 5 to 15 $kg/cm^2$ using a hot press machine.

Using a microtome, a thin slice for observation sample (50 to 100 μm in thickness) was cut out along a direction perpendicular to the film surface. Using a transmission electron microscope (JEM-1200EX manufactured by JEOL Ltd.), a dispersing state of the silane-treated foliated phyllosilicate was evaluated at an accelerating voltage of 80 kV and a magnification of 40,000 to 100,000.

Measurement was conducted by choosing a region in a TEM photograph in which at least 100 dispersing particles were present and thereafter manually measuring the number of dispersing particles [(N) value], layer thickness and layer length with a scale or, if necessary, processing the photograph with an image analyzer PIAS III manufactured by Interquest Co.

The maximum layer thickness was defined as the maximum value among layer thickness of every silane-treated foliated phyllosilicate. The average layer thickness was defined as the number average value of layer thickness of every silane clay.

The [N] value was determined as follows. First, in a TEM image, the number of silane-treated foliated phyllosilicate particles present in a chosen region is counted. On the other hand, ash content of the polyester resin composition derived from the silane-treated foliated phyllosilicate is measured. The [N] value is obtained by dividing the number of the particles by the ash content to convert the result into a value for a 100 $μm^2$ area.

The average aspect ratio was defined as the number average of layer length to layer thickness ratio of every silane-treated foliated phyllosilicate.

[100] is defined as a proportion of particles having a layer thickness of at least 100 Å among the observed dispersing particles. [R200] is defined as a proportion of particles having a layer thickness of at least 200 Å among the observed dispersing particles. [R300] is defined as a proportion of particles having a layer thickness of at least 300 Å among the observed dispersing particles.

When the dispersing particles are so large that observation with TEM is inadequate, the [N] value is obtained in the same manner as previously mentioned using an optical microscope (an optical microscope BH-2 manufactured by Olympus Optical Co., Ltd.). A sample was melted at 250 to 270° C. by using a hot stage THM600 manufactured by LINKAM and the a state of dispersing particles was measured in the molten state if necessary.

A layer thickness of dispersing particles, which are not dispersed into plates, is defined as a shorter diameter thereof. An aspect ratio is defined as a value of (longer diameter)/(shorter diameter). A "longer diameter" of a particle means a longer side of an imaginary rectangle, which has the smallest area of the rectangle circumscribing the particle in a microscope image or the like. In addition, a shorter diameter means a shorter side of the smallest rectangle.

(Ash Content)

An ash content of the polyester resin composition derived from a silane-treated foliated phyllosilicate is measured according to JIS K 7052.

(Deflection Temperature Under Load)

After drying a polyester resin composition at 140° C. for 5 hours, a test piece having dimensions of about 10×100×6 mm is prepared by injection molding at a resin temperature of 250 to 280° C., a gauge pressure of about 10 MPa and an injection rate of bout 50% using an injection molding machine with a mold clamping force of 75 t (IS-75E manufactured by Toshiba Machine Co., Ltd.). A deflection temperature under load of the obtained test piece is measured according to ASTM D-648.

(Flexural Property)

Flexural strength and flexural modulus of a test piece prepared in the same manner as that in the case of the deflection temperature under load are measured according to ASTM D-790.

(Warpage)

After drying a polyester resin composition (140° C., 5 hours), a flat plate-like test piece having a dimension of about 120×120×1 mm is prepared by injection molding under conditions of a die temperature of 50° C., a resin temperature of 250 to 280° C., a gauge pressure of about 10 MPa and an injection rate of bout 50% using an injection molding machine with a mold clamping force of 75 t (IS-75E manufactured by Toshiba Machine Co., Ltd.) The flat plate-like test piece was placed on a plane. One of the four corners of the test piece was pushed against the plane, and the largest value among the distances from the plane to each of the three remaining corners is measured with vernier calipers or the like. Each of the four corners was pushed alternately and an average of the obtained warpage values is calculated.

(Heat Shrinkage Ratio)

A flat plate-like test piece having a dimension of about 120×120×2 mm was injection molded under the same conditions as previously mentioned. The flat plate-like test piece was annealed at 150° C. for 3 hours. Dimensions in the MD direction and the TD direction of the test piece after annealing are measured and a heat shrinkage ratio is calculated by using the following formula:

Heat shrinkage ratio={(actual dimension of die)−(dimension of test piece after annealing)}×100/(actual dimension of die)(%)

(Coefficient of Linear Expansion)

JIS 1 dumbbell-shaped test pieces having about 3mm thickness are used, which are prepared under the same conditions as those in the case of deflection temperature under load.

A center portion of the dumbbell-shaped test piece is cut out into a size of about 7 mm×7 mm. After the test piece is held at 20° C. for 5 minutes with SSC-5200 and TMA-120C manufactured by Seiko Electronics Components Ltd., it is heated in the range of 20 to 150° C. at a heating rate of 5° C./minute.

A coefficient of linear expansion in the range of 30 to 120° C. was calculated.

(Roughness at Center Line)

By using the dumbbell-shaped test piece, roughness at a center line is measured with a surface roughness meter surfcom 1500A manufactured by Tokyo Seimitsu Co., Ltd.

(Surface Appearance of Molded Article)

By using a test piece prepared in the same manner as that in the case of deflection temperature under load, brilliance and color tone thereof are visibly observed to evaluate according to the following criteria:

○: There is brilliance and there is no unevenness in color tone.

Δ: It is not transparent or there is a unevenness in color tone.

X: It is not transparent and there is a unevenness in color tone. cl EXAMPLES 1 TO 10 silane-treated Foliated Phyllosilicate Preparing Step (A) (Preparation of an Aqueous Dispersion System Containing a Silane-treated Foliated Phyllosilicate and Water)

(Silane-Treated Foliated Phyllosilicates a to d)

A swellable phyllosilicate was dispersed into ion-exchanged water under stirring at 5000 rpm for 3 minutes using a high-speed stirrer. After that, aqueous dispersion system comprising a silane-treated foliated phyllosilicate and water was obtained by dropping the organo-silane shown in Table 1 with a simple pipette and stirring. These are designated as water/silane-treated foliated phyllosilicates a to d.

Among the organo-silane, A1120 (γ-(2-aminoethyl) aminopropyltrimethoxysilane) was directly as it was, A187 (γ-glycidoxypropyltrimethoxysilane) was used after hydrolysis with ethanol/water mixed solvent whose pH was previously adjusted to 5.0, and A1230 (γ-polyoxyethylenepropyltrimethoxysilane) was used after hydrolysis with water whose pH was previously adjusted to 3.0 with hydrochloric acid.

The silane-treated foliated phyllosilicate was identified by measuring, with SAXS, a basal spacing of a sample obtained by separating solids from a dispersion system, drying and pulverizing the solids, and by measuring absorption bands of a functional group derived from an organo-silane obtained by washing a silane-treated foliated phyllosilicate with THF by means of FT-IR.

Kinds, amounts, and measurements of the above-mentioned raw materials are shown in Table 1.

TABLE 1

| | mont | | | | | | | silane-treated foliated phyllosilicate | |
|---|---|---|---|---|---|---|---|---|---|
| | deionized water (g) | morillo nite (g) | swellable mica (g) | A1120 (g) | A187 (g) | A1230 (g) | stirring conditions | IR absorption band | basal spacing (Å) |
| water/silane-treated foliated phyllosilicate a | 5200 | 150 | | 15 | | | 6000 rpm 2 hrs | primary amino group, secondary amino group, ethylene group | 25 |
| water/silane-treated foliated phyllosilicate b | 4500 | 150 | | | 15 | | 20000S$^{-1}$ 3 hrs | epoxy group, ether group, methylene group | 19 |
| water/silane-treated foliated phyllosilicate c | 4500 | 150 | | | | 15 | 20000S$^{-1}$ 3 hrs | ether group, ethylene group | 22 |
| water/silane-treated foliated phyllosilicate d | 3500 | | 150 | 30 | | | 30000S$^{-1}$ 3 hrs | primary amino group, secondary amino group, ethylene group | 17 |

A1120 γ-(2-aminoethyl)aminopropyltrimethoxysilane
A187 γ-glycidoxypropyltrimethoxysilane
A1230 γ-(polyoxyethylene)propyltrimethoxysilane Dispersion System Preparing Step (B) (Preparation of Dispersion System Comprising a Silane-Treated Foliated Phyllosilicate and Glycols or BHET)

Dispersion systems (containing a trace of water) comprising a silane-treated foliated phyllosilic ate and EG, 1,4-BD or BHET were prepared by sufficiently mixing a dispersion system containing a silane-treated foliated phyllosilicate shown in Table 2 and water, and EG (ethylene glycol), 1,4-BD (1,4-butanediol) or BHET (bishydroxyethyl terephthalate), stirring at a temperature of approximately 100 to 130° C. for about 3 hours, and removing water by reducing pressure with stirring for about 1 hour. Dispersion systems containing the silane-treated foliated phyllosilicates a to d and EG are designated as EG- a to d, dispersion system containing a silane-treated foliated phyllosilicate a and 1,4-BD is designated as BD-a, and dispersion systems containing silane-treated foliated phyllosilicates a to d and BHET are designated as BHET-a to d.

Small-angle X-ray diffraction measurement (SAXS) of the obtained dispersion systems was carried out to measure basal spacings of the silane-treated foliated phyllosilicates contained in the dispersion systems.

Table 2 shows the used water/silane-treated foliated phyllosilicates a to d, EG, 1,4-BD, BHET and measurement of basal spacings.

A polyester resin composition was prepared by using PET, a dispersion system EG- a, EG and a stabilizer as in the following manner.

Mixture Preparing Step (C)

A polymerization apparatus equipped with a distillation tube was charged with 2000 g of PET, 600 g of EG, 6.0 g of a hindered phenol type stabilizer (Adekastab AO60 available from Asahi Denka Kogyo K. K., hereinafter referred to as "AO60"). The mixture was stirred for about 1 hour and 30 minutes under dry nitrogen stream at a reaction temperature of 180 to 240° C. with distilling the excess EG to depolymerize PET. After the depolymerization, a sampled mixture had a logarithmic viscosity of 0.14 (dl/g). The product obtained by the depolymerization was kept at 230 to 250° C., and 1400 g of the dispersion system EG-a was continuously added thereto under dry nitrogen stream with stirring adequately (100 to 140 rpm) by means of an H-shaped stirring blade. The adding rate of the dispersion system was about 2000 g/hour.

Molecular Weight Increasing Step (D)

After removing most (at least 70%) of the EG contained in the dispersion system added in the dispersion medium adding step with heating the reaction system to 280° C., the pressure of the system was reduced (0.5 to 5.0 torr) to melt condensation polymerization.

TABLE 2

| dispersion medium | water/silane-treated foliated phyllosilicate | | | | glycols | | BHET | basal spacing of silane-treated foliated phyllosilicate in |
|---|---|---|---|---|---|---|---|---|
| | a (g) | b (g) | c (g) | d (g) | EG (g) | 1.4-BD (g) | (g) | dispersion medium |
| EG - a | 4200 | | | | 1700 | | | >100 |
| EG - b | | 3000 | | | 1250 | | | 78 |
| EG - c | | | 3000 | | 1250 | | | >100 |
| EG - d | | | | 2400 | 1250 | | | 71 |
| BD - a | 4200 | | | | | 1700 | | >100 |
| BHET - a | 1200 | | | | | | 2500 | >100 |
| BHET - b | | 3000 | | | | | 2500 | >100 |
| BHET - c | | | 3000 | | | | 2500 | >100 |
| BHET - d | | | | 3000 | | | 2500 | >100 |

The polyester resin compositions obtained in the above-mentioned manner were evaluated. The results are shown in Tables 3 and 4.

EXAMPLES 2 TO 9

Polyester resin compositions were prepared in the following manner using the dispersion systems (EG- a to d) containing the silane-treated foliated phyllosilicates a to d and EG, the dispersion systems (dispersion systems BHET-a to d) containing the silane-treated foliated phyllosilicates a to d and BHET, which were obtained in the silane-treated foliated phyllosilicate preparing step (A) and the dispersion system preparing step (B), and using EG, a stabilizer and a polymerization initiator.

Mixture Preparing Step (C)

A polymerization apparatus equipped with a distillation tube was charged with a dispersion system (in a molten state at 120 to 140° C.) containing a silane-treated foliated phyllosilicate and BHET, a stabilizer AO60, and 0.36 g of antimony trioxide ($Sb_2O_3$, hereinafter referred to as $Sb_2O_3$) as a polymerization initiator. Subsequently, the mixture was heated and kept at 230 to 250° C. under dry nitrogen stream, and a dispersion system containing a silane-treated foliated phyllosilicate and EG was continuously added with stirring the reaction system adequately (100 to 140 rpm) by means of an H-shaped stirring blade. The adding rate of the dispersion system was about 2000 g/hour.

Molecular Weight Increasing Step (D)

After removing most (at least 70%) of the EG contained in the dispersion system added in the dispersion medium adding step with heating the reaction system to 280° C., the pressure of the system was reduced (0.5 to 5.0 torr) to polymerize in melt condensation.

The used raw materials were shown in Table 3.

The polyester resin compositions obtained in the above-mentioned manner were evaluated. The results are shown in Tables 3 and 4.

EXAMPLE 10

A polyester resin composition was prepared in the following manner using PBT, the dispersion system BD-a, 1,4-BD and a stabilizer.

Mixture Preparing Step (C)

A polymerization apparatus equipped with a distillation tube was charged with 2000 g of PBT, 600 g of 1,4-BD, 6.0 g of A)60 to depolymerize PBT, and the excess 1,4-BD was distilled off by stirring under dry nitrogen stream at a reaction temperature of 200 to 240° C. for about 1 hour. A sampled mixture had a logarithmic viscosity of 0.17 (dl/g).

The molten product obtained by the depolymerization was kept at 230 to 240° C., and 1400 g of the dispersion system BD-a was continuously added thereto with stirring adequately (100 to 140 rpm) by means of an H-shaped stirring blade. The adding rate of the dispersion system was about 2000 g/hour.

Molecular Weight Increasing Step (D)

After removing most (at least 70%) of the 1,4-BD contained in the dispersion system added in the dispersion medium adding step with heating the reaction system to 270° C., the pressure of the system was reduced (0.5 to 5.0 torr) to polymerize in melt condensation.

The polyester resin compositions obtained in the above-mentioned manner were evaluated. The results are shown in Tables 3 and 4.

TABLE 3

| example | | 1 | 2 | 3 | 4 | 5 | 6 | 7 | 8 | 9 | 10 |
|---|---|---|---|---|---|---|---|---|---|---|---|
| amount of silane-treated foliated phyllosilicate (*1) | parts by weight | 4.8 | 4.8 | 4.8 | 4.8 | 4.8 | 10.0 | 4.8 | 4.8 | 4.8 | 4.8 |
| glycol dispersion medium | kind | EG-a | EG-a | EG-a | EG-a | EG-a | EG-a | EG-b | EG-c | EG-d | BD-a |
| | g | 1600 | 1130 | 810 | 480 | 250 | 1700 | 810 | 810 | 810 | 1600 |
| BHET dispersion medium | kind | | BHET-a | BHET-a | BHET-a | BHET-a | BHET-a | BHET-b | BHET-c | BHET-d | |
| | g | | 690 | 1150 | 1610 | 2120 | 2500 | 690 | 690 | 690 | |
| polyester unit or polymer having a low polymerization degree | PET (*2) g | 2000 | 1480 | 1130 | 780 | 400 | 110 | 1480 | 1480 | 1480 | |
| | EG g | 600 | 450 | 340 | 240 | 120 | 33 | 450 | 450 | 450 | |
| | PBT (*3) g | | | | | | | | | | 2000 |
| | 1,4-BD | | | | | | | | | | 600 |
| stabilizer | g | 6.0 | 6.0 | 6.0 | 6.0 | 6.0 | 6.0 | 6.0 | 6.0 | 6.0 | 6.0 |
| glycol | EG g | 600 | 500 | 400 | 400 | 300 | 400 | 500 | 500 | 500 | |
| | 1,4-BD | | | | | | | | | | 600 |
| logarithmic viscosity at adding dispersion medium | dl/g | 0.14 | 0.13 | 0.11 | 0.09 | 0.09 | 0.12 | 0.13 | 0.13 | 0.13 | 0.17 |
| logarithmic viscosity of polyester resin composition | dl/g | 0.63 | 0.63 | 0.62 | 0.62 | 0.63 | 0.61 | 0.63 | 0.63 | 0.63 | 0.63 |
| ash content | % by weight | 4.3 | 4.4 | 4.3 | 4.4 | 4.5 | 10.8 | 4.5 | 4.4 | 4.4 | 4.3 |
| maximum layer thickness | Å | 1490 | 1290 | 860 | 350 | 210 | 1430 | 1450 | 1460 | 1490 | 1480 |
| average layer thickness | Å | 183 | 112 | 75 | 51 | 35 | 81 | 105 | 115 | 241 | 118 |
| the number of dispersing particles | /wt % 100 μ2 | 51 | 69 | 93 | 108 | 121 | 56 | 68 | 64 | 41 | 56 |
| aspect ratio | | 65 | 78 | 123 | 190 | 210 | 69 | 72 | 78 | 51 | 70 |
| [R100] | % | 52 | 44 | 33 | 21 | 15 | 35 | 54 | 56 | 50 | 57 |

TABLE 3-continued

| example | | 1 | 2 | 3 | 4 | 5 | 6 | 7 | 8 | 9 | 10 |
|---|---|---|---|---|---|---|---|---|---|---|---|
| [R200] | % | 37 | 27 | 18 | 9 | 6 | 20 | 38 | 40 | 36 | 41 |
| [R300] | % | 30 | 19 | 11 | 6 | 3 | 12 | 31 | 32 | 29 | 34 |

(*1) amount of silane-treated foliated phyllosilicate: amount of silane-treated foliated phyllosilicate contained in a glycol dispersion medium and BHET dispersion medium based on a resin
(*2) PET/EG Polyester having a low polymerization degree was used, which was obtained by depolymerizing PET with EG.
(*3) PBT/1.4-BD Polyester having a low polymerization degree was used, which was obtained by depolymerizing PBT with 1.4-BD.

TABLE 4

| example | | | 1 | 2 | 3 | 4 | 5 | 6 | 7 | 8 | 9 | 10 |
|---|---|---|---|---|---|---|---|---|---|---|---|---|
| flexural strength | | MPa | 150 | 144 | 138 | 130 | 130 | 155 | 148 | 139 | 142 | 120 |
| flexural modulus | | MPa | 6050 | 5850 | 5600 | 5390 | 5350 | 7100 | 5830 | 5750 | 5800 | 3950 |
| deflection temperature under load | | °C. | 220 | 212 | 205 | 198 | 195 | 235 | 223 | 205 | 215 | 193 |
| warpage | | mm | <0.1 | <0.1 | <0.1 | 0.1 | 0.1 | <0.1 | <0.1 | <0.1 | 0.1 | 0.2 |
| coefficient of linear expansion | MD direction | $10^{-5}$/°C. | 5.62 | 5.63 | 5.98 | 6.23 | 6.33 | 4.12 | 5.98 | 5.78 | 6.31 | 5.89 |
| | TD direction | $10^{-5}$/°C. | 5.63 | 5.65 | 6.05 | 6.35 | 6.46 | 4.12 | 6.06 | 5.81 | 6.46 | 5.91 |
| | MD/TD | | 1.00 | 1.00 | 0.99 | 0.98 | 0.98 | 1.00 | 0.99 | 0.99 | 0.98 | 1.00 |
| shrinkage ratio | MD direction | % | 1.310 | 1.315 | 1.330 | 1.358 | 1.362 | 1.205 | 1.315 | 1.320 | 1.314 | 1.180 |
| | TD direction | % | 1.314 | 1.328 | 1.357 | 1.400 | 1.409 | 1.205 | 1.340 | 1.333 | 1.342 | 1.191 |
| | MD/TD | | 1.00 | 0.99 | 0.98 | 0.97 | 0.97 | 1.00 | 0.98 | 0.99 | 0.98 | 0.99 |
| roughness at center line | | μm | 0.04 | 0.04 | 0.04 | 0.02 | 0.02 | 0.06 | 0.04 | 0.04 | 0.04 | 0.02 |
| surface appearance | | | ○ | ○ | ○ | ○ | ○ | ○ | ○ | ○ | ○ | ○ |

COMPARATIVE EXAMPLE 1

A polymerization apparatus having a scraper and equipped with a twin-screw stirring blade having high shearing ability and a distillation tube was chaged with 2600 g of a dispersion system BHET-a (in a molten state at 120 to 140° C.), 6.0 g of a stabilizer AO60 and 0.36 g of $Sb_2O_3$.

While the mixture was heated gradually 140° C. to 240° C., stirring was continued for about 3 hours in order to apply shear to the system. Subsequently, poly(ethylene terephthalate) (PET) was polymerized with stirring under reduced pressure (0.5 to 5.0 torr) at a polymerization temperature of 280° C. A logarithmic viscosity of the resin was 0.59 (dl/g).

The resin was evaluated in the same manner as Example 1. Results are shown in Table 5.

COMPARATIVE EXAMPLE 2

Montmorillonite treated with organo-silanes was prepared by spraying 10 g of A1120 to 100 g of montmorillonite with a spray and stirring for 1 hour. The montmorillonite treated with organo-silanes had a basal spacing of 13 Å. FT-IR was measured after washing with THF to observe absorption bands derived from a primary amino group, a secondary amino group and an ethylene group.

PET was depolymerized in the same manner as Example 1 under dry nitrogen stream (after depolymerization, a sampled mixture had a logarithmic viscosity of 0.11 (dl/g)). And 100 g of the montmorillonite treated with organo-silanes was continuously added under stirring with an H-shaped stirring blade.

Subsequently, the system was heated to 280° C., and the pressure was reduced (0.5 to 5.0 torr) to polymerize in melt condensation. The polyester resin compositions obtained in the above-mentioned manner were evaluated. The results are shown in Table 5.

COMPARATIVE EXAMPLE 3

A polyester resin composition was prepared in the same manner as in Comparative Example 2 except for using montmorillonite (100 g) in place of the montmorillonite treated with organo-silanes to evaluate it. The results are given in Table 5.

REFERENTIAL EXAMPLE 1

An autoclave equipped with a distillation tube and a rectifying column was chaged with 2500 g of dimethyl terephthalate, 1600 g of EG, 7.5 g of AO60 and 0.60 g of titanium tetrabutoxide and the mixture was stirred at a reaction temperature of about 190° C. for about 3 hours to transesterify dimethyl tetraphthalate and EG. Subsequently, the rectifying column was detached, 0.6 g of antimony trioxide was added to polymerize in melt condensation at a reaction temperature of 270 to 280° C. under reduced pressure (0.8 to 5.0 torr). The obtained PET resin was evaluated. The results are shown in Table 5.

REFERENTIAL EXAMPLE 2

An autoclave equipped with a distillation tube and a rectifying column was chaged with 2170 g of dimethyl terephthalate, 2000 g of 1,4-BD, 7.5 g of AO60 and 0.65 g of titanium tetrabutoxide with stirring at a reaction temperature of about 190° C. for about 3 hours to transesterify dimethyl terephthalate and 1,4-BD. Subsequently, the rectifying column was detached and melt condensation polymerization was conducted at a reaction temperature of 250 to 270° C. under reduced pressure (0.8 to 5.0 torr). The obtained PBT resin was evaluated. The results are shown in Table 5.

TABLE 5

| example | | comparative example | | | referential example | |
|---|---|---|---|---|---|---|
| | | 1 | 2 | 3 | 1 | 2 |
| resin | | PET | PET | PET | PET | PBT |
| swellable phyllosilicate | | silane-treated foliated phyllosilicate-a | montmorillonite treated with silane | montmorillonite | — | |
| logarithmic viscosity of resin | dl/g | 0.62 | 0.63 | 0.63 | 0.62 | 0.83 |
| amount of filler (*1) | parts by weight | 4.8 | 4.8 | 4.8 | 0 | 0 |
| ash content | % by weight | 4.6 | 4.5 | 4.5 | 0 | 0 |
| maximum layer thickness (*2) | Å | 83 | 1,000,000 | 900,000 | | |
| average layer thickness (*3) | Å | 19 | 33300 | 31600 | | |
| the number of dispersing particles | /wt % 100 μ2 | 145 | 1 | 1 | | |
| aspect ratio (*4) | | 240 | 1.5 | 1.5 | | |
| [R100] | % | 0 | 0 | 0 | | |
| [R200] | % | 0 | 0 | 0 | | |
| [R300] | % | 0 | 0 | 0 | | |
| flexural strength | MPa | 118 | 106 | 103 | 104 | 85 |
| flexural modulus | MPa | 5050 | 3110 | 3190 | 2970 | 2610 |
| deflection temperature under load | °C. | 190 | 145 | 150 | 140 | 160 |
| warpage | mm | 0.5 | impossible to mold | impossible to mold | impossible to mold | 10.9 |
| coefficient of linear expansion MD direction | $10^{-5}$/°C. | 6.95 | 7.40 | 7.39 | 7.41 | 6.89 |
| coefficient of linear expansion TD direction | $10^{-5}$/°C. | 8.24 | 12.16 | 12.18 | 12.22 | 14.23 |
| coefficient of linear expansion MD/TD | | 0.84 | 0.61 | 0.61 | 0.61 | 0.48 |
| shrinkage ratio MD direction | % | 1.350 | impossible to measure | impossible to measure | impossible to measure | 1.315 |
| shrinkage ratio TD direction | % | 1.460 | impossible to measure | impossible to measure | impossible to measure | 1.410 |
| shrinkage ratio MD/TD | | 0.92 | — | — | — | 0.93 |
| roughness at center line | μm | 0.02 | 0.822 | 0.806 | 0.02 | 0.02 |
| surface appearance | | ○ | ○ | Δ | Δ | ○ | ○ |

(*1) amount of filler: amount of silane-treated foliated phyllosilicate, montmorillonite treated with silane, and montmorillonite based on a resin
(*2) The value was defined as a number average of shorter diameter of dispersing particles, since particles were not dispersed in a plate state.
(*3) The value was defined as a maximum value of shorter diameter of dispersing particles, since particles were not dispersed in a plate state.
(*4) The value was defined as a ratio of longer diameter to shorter diameter of dispersing particles, since particles were not dispersed in a plate state.

INDUSTRIAL APPLICABILITY

According to the present invention, resin molded articles having sufficiently improved flexural properties, deflection temperature under load and dimension stability (reduction in warpage and anisotropy in coefficient of linear expansion and heat shrinkage ratio) and excellent surface appearance can be obtained by making a thermoplastic polyester resin contain at least 10% of a silane-treated foliated phyllosilicate having a layer thickness of substantially at most 2000 Å and having a layer thickness of more than 100 Å and at most 2000 Å, resin molded articles having fully improved bending characteristics, deflection temperature under load and dimension stability (reduction in warpage, coefficient of linear expansion and heat shrinkage) and having good surface appearance can be obtained As previously mentioned in detail, if a silane-treated foliated phyllosilicate has a layer thickness of substantially at most 2000 Å, its incorporation into a thermoplastic polyester resin does not affect surface appearance of molded articles or the like. Moreover, since it is difficult to warp when it has a layer thickness of more than 100 Å and at most 2000 Å, a reinforcing effect on resin, an effect on dimension stability or the like can be efficiently achieved.

The polyester resin composition of the present invention can be obtained, for example, by the preparing process of the present invention, namely, a preparing process comprising a silane-treated foliated phyllosilicate preparing step (A) in which a basal spacing of a swellable phyllosilicate is expanded in a dispersion medium and thereafter an organo-silane is introduced to obtain a silane-treated foliated phyllosilicate; a dispersion system preparing step (B) in which a glycol dispersion system containing the silane-treated foliated phyllosilicate and glycols is prepared; a mixture preparing step (C) in which the glycol dispersion system is added to a polyester unit and/or a polyester having a low polymerization degree in a molten state to obtain a mixture; and a molecular weight increasing step (D) in which a molecular weight of the polyester unit and/or the polyester having a low polymerization degree in the mixture is increased by a condensation polymerization reaction.

What is claimed is:

1. A polyester resin composition comprising a thermoplastic polyester resin and a silane-treated foliated phyllosilicate, wherein the silane-treated foliated phyllosilicate is prepared by introducing an organo-silane represented by the following general formula (I):

$$Y_n SiX_{4-n} \tag{1}$$

wherein n denotes an integer of 0 to 3, Y denotes a hydrocarbon group having 1 to 25 carbon atoms, X denotes a hydrolyzable group or a hydroxyl group, n units of Y or (4−n) units of X may, respectively, be the same or different if n or (4−n) is at least 2, into a swellable phyllosilicate, and wherein the maximum layer thickness of the silane-treated foliated phyllosilicate in the polyester resin composition is more than 200 Å and up to 1,800 Å;

wherein said hydrocarbon group optionally comprises at least one of the following: an ester bond, an ether bond, an epoxy group, an amino group, a carboxyl group, a carbonyl group, an amide group, a mercapto group, a sulfonyl bond, a sulfinyl bond, a nitro group, a nitroso group, a nitrile group, a halogen atom, and a hydroxyl group;

and wherein the dispersing particle number [N] of the silane-treated foliated phyllosilicate particles present in a 100 m² area of the polyester resin composition is at least 30 based on unit proportion.

2. The polyester resin composition of claim 1, wherein the maximum layer thickness of the silane-treated foliated phyllosilicate in the polyester resin composition is 300 Å to 1500 Å.

3. The polyester resin composition of claim 1, wherein the average layer thickness of the silane-treated foliated phyllosilicate in the polyester resin composition is at least 20 Å and at most 500 Å.

4. The polyester resin composition of claim 1, wherein the average layer thickness of the silane-treated foliated phyllosilicate in the polyester resin composition is more than 50 Å and at most 300 Å.

5. The polyester resin composition of claim 1, wherein an average aspect ratio (layer length/layer thickness ratio) of the silane-treated foliated phyllosilicate in the polyester resin composition is 10 to 300.

6. The polyester resin composition of claim 1, wherein a proportion [100] of the number of silane-treated foliated phyllosilicates having layer thickness larger than 100 Å to the total number of the silane-treated foliated phyllosilicate is at least 10%.

7. The polyester resin composition of claim 1, wherein the [100] value is at least 30%.

8. The polyester resin composition of claim 1, wherein the [100] value is at least 50%.

9. The polyester resin composition of claim 6, wherein a proportion [R200] of the number of the silane-treated foliated phyllosilicates having layer thickness larger than 200 Å to the total number of the silane-treated foliated phyllosilicates is at least 0.3×[100].

10. The polyester resin composition of claim 6, wherein the [R200] value is at least 0.7×[100].

11. The polyester resin composition of claim 6, wherein a proportion [R300] value of the number of silane-treated foliated phyllosilicates having layer thickness larger than 300 Å to the total number of the silane-treated foliated phyllosilicates is at least 0.4×[R200].

12. The polyester resin composition of claim 9 wherein the [R300] value is at least 0.8×[R200].

13. A process for preparing a polyester resin composition comprising a thermoplastic polyester resin and a silane-treated foliated phyllosilicate, which comprises (A) a step of preparing a silane-treated foliated phyllosilicate by introducing an organo-silane represented by the following general formula (I):

$$Y_n SiX_{4-n} \qquad (I)$$

wherein n denotes an integer of 0 to 3, Y denotes a hydrocarbon group having 1 to 25 carbon atoms, X denotes a hydrolyzable group or a hydroxyl group, n units of Y or (4−n) units of X may, respectively, be the same or different if n or (4−n) is at least 2, into a swellable phyllosilicate, (B) a step of preparing a dispersion system by mixing the silane-treated foliated phyllosilicate and glycols, (C) a step of preparing a mixture by adding the dispersion system to a molten polyester unit and/or polyester with a low molecular weight, and (D) a step of increasing a molecular weight of the polyester unit and/or the polyester with a low molecular weight in the above mixture by condensation polymerization, wherein the maximum layer thickness of the silane-treated foliated phyllosilicate is greater than 200 Å and up to 1,800 Å.

14. The process for preparing a polyester resin composition of claim 13, wherein, in the step (A), the silane-treated foliated phyllosilicate is obtained by adding the organo-silane after enlarging a basal spacing of the swellable phyllosilicate in a dispersion medium, and thereby a basal spacing of the silane-treated foliated phyllosilicate becomes larger than the initial basal spacing of the swellable phyllosilicate by the introduced organo-silane.

15. The process for preparing a polyester resin composition of claim 13, wherein an basal spacing of the silane-treated foliated phyllosilicate dispersing in the dispersion system obtained in the step (B) is at least three times larger than the initial basal spacing of the swellable phyllosilicate.

16. The process for preparing a polyester resin composition of claim 13, wherein a logarithmic viscosity of the polyester unit and/or the polyester with a low molecular weight is at least 0.001 dl/g to less than 0.4 dl/g.

17. The process for preparing a polyester resin composition of claim 13, wherein the polyester unit and/or the polyester with a low molecular weight is obtained by depolymerizing a polyester resin material with glycols.

* * * * *